US011124031B2

(12) United States Patent
 Wolfe et al.

(10) Patent No.: US 11,124,031 B2
(45) Date of Patent: Sep. 21, 2021

(54) RETRACTABLE PULL HANDLE ASSEMBLIES FOR FIFTH WHEELS

(71) Applicant: Fontaine Fifth Wheel Company, Jasper, AL (US)

(72) Inventors: Michael Shane Wolfe, Hanceville, AL (US); Russell Wayne Melton, Winfield, AL (US)

(73) Assignee: Fontaine Fifth Wheel Company, Jasper, AL (US)

( * ) Notice: Subject to any disclaimer, the term of this patent is extended or adjusted under 35 U.S.C. 154(b) by 360 days.

(21) Appl. No.: 16/273,541

(22) Filed: Feb. 12, 2019

(65) Prior Publication Data

US 2019/0263202 A1 Aug. 29, 2019

Related U.S. Application Data

(60) Provisional application No. 62/636,247, filed on Feb. 28, 2018.

(51) Int. Cl.
*B60D 1/36* (2006.01)
*B60D 1/01* (2006.01)
(Continued)

(52) U.S. Cl.
CPC .............. *B60D 1/015* (2013.01); *B60D 1/36* (2013.01); *B62D 53/0885* (2013.01); *B62D 53/10* (2013.01); *B62D 53/12* (2013.01)

(58) Field of Classification Search
CPC .......... B60D 1/015; B60D 1/36; B62D 53/12; B62D 53/0885; B62D 53/10
See application file for complete search history.

(56) References Cited

U.S. PATENT DOCUMENTS

| 2,977,137 A | 3/1961 | Durham |
| 3,848,689 A | 11/1974 | Hilterhaus |
(Continued)

FOREIGN PATENT DOCUMENTS

| DE | 2121876 | 12/1972 |
| WO | 1996020864 A1 | 7/1996 |

OTHER PUBLICATIONS

Extended European Search report issued for European Application No. 19159332.6, dated Jul. 9, 2019.
(Continued)

*Primary Examiner* — Kevin Hurley
*Assistant Examiner* — Marlon A Arce
(74) *Attorney, Agent, or Firm* — Andrus Intellectual Property Law, LLP

(57) ABSTRACT

A fifth wheel for locking to a kingpin of a towed trailer includes an operating arm pivotable into and between a locked position for locking the kingpin in the fifth wheel and an unlocked position in which the kingpin can be removed from or inserted into the fifth wheel and a housing coupled to the operating arm. A pull handle is slidable in the housing into and between an extended position in which the pull handle extends from the housing and a retracted position in which the pull handle is retracted into the housing. A spring in the housing biases the pull handle towards the retracted position. When the operating arm is pivoted into the locked position the pull handle is forced into the extended position, and after the operating arm is pivoted to the unlocked position the pull handle moves to the retracted position.

18 Claims, 4 Drawing Sheets

(51) Int. Cl.
   *B62D 53/08* (2006.01)
   *B62D 53/10* (2006.01)
   *B62D 53/12* (2006.01)

(56) References Cited

U.S. PATENT DOCUMENTS

| | | | |
|---|---|---|---|
| 3,888,514 | A | 6/1975 | Klein |
| 4,946,183 | A | 8/1990 | Benson et al. |
| 5,451,069 | A * | 9/1995 | Schueman ............. B60G 5/005 |
| | | | 180/209 |
| 5,516,137 | A | 5/1996 | Kass et al. |
| 5,516,138 | A * | 5/1996 | Fontaine ................ B62D 53/12 |
| | | | 280/434 |
| 5,641,174 | A | 6/1997 | Terry et al. |
| 5,876,055 | A | 3/1999 | Fontaine |
| 5,988,665 | A | 11/1999 | Terry et al. |
| 5,988,666 | A | 11/1999 | Flater |
| 6,095,544 | A | 8/2000 | Flater |
| 7,240,913 | B2 | 7/2007 | Kahrs et al. |
| 7,384,056 | B2 | 6/2008 | Anderson |
| 7,537,235 | B2 | 5/2009 | Flater et al. |
| 7,735,849 | B1 | 6/2010 | Mann |
| 8,210,558 | B2 | 7/2012 | Mann et al. |
| 9,102,371 | B2 | 8/2015 | Keatley |
| 9,302,557 | B2 | 4/2016 | Alldredge et al. |
| 9,327,782 | B2 | 5/2016 | Alldredge et al. |
| 9,738,333 | B2 | 8/2017 | Alldredge et al. |
| 2010/0127479 | A1 * | 5/2010 | Weipert ................... B60D 1/07 |
| | | | 280/491.1 |

OTHER PUBLICATIONS

Fifth Wheel Catalog, p. 5 item No. 10, https://www.jostinternational.com/wp-content/uploads/2016/06/5th-Wheel-Catalog.pdf, retrieved on Feb. 5, 2019.

Jost Product Bulletin, https://www.jostinternational.com/wp-content/uploads/2016/02/LT-JSK37-47-Product-Bulletin-Retractable-Handle-Update.pdf, retrieved on Feb. 5, 2019.

* cited by examiner

RETRACTABLE PULL HANDLE ASSEMBLIES FOR FIFTH WHEELS

CROSS-REFERENCE TO RELATED APPLICATION

The present application is based on and claims priority to U.S. Provisional Patent Application No. 62/636,247 filed Feb. 28, 2018, the disclosure of which is incorporated herein by reference.

FIELD

The present disclosure relates to retractable pull handle assemblies for fifth wheels.

BACKGROUND

The following U.S. patents are incorporated herein by reference in entirety.

U.S. Pat. No. 5,516,138 discloses a mechanism for locking and unlocking of a king pin of a fifth wheel. The mechanism includes a jaw member, a wedge member, a bumper member, and a lever member interconnecting the jaw member, the wedge member, and the bumper member. A handle member includes a handle extension member.

U.S. Pat. No. 5,641,174 discloses an interconnection of a jaw, a wedge, and operating handle in a fifth wheel that ensures security of a fifth wheel system. The jaw is connected to the operating handle by a pivoting timing lever which pivots off a pin on the jaw such that the jaw remains engaged with the fifth wheel until the wedge is substantially removed from engagement with the jaw. In cooperation with the primary locking mechanism, a secondary lock is provided at the end of the operating handle such that a pawl arrangement engages a stop on the fifth wheel assembly until positively released by the operator.

U.S. Pat. No. 7,735,849 discloses a fifth wheel hitch and a locking mechanism for retaining a trailer kingpin within a fifth wheel slot. The locking mechanism includes a jaw assembly comprised of two opposing jaw members pivotally attached at one end to the underside of the hitch plate and a longitudinally sliding cam interposed between the jaw members with a tip that contacts a bumper. The bumper is pivotally attached to tie bar that has its rear most end pivotally attached to the underside of the hitch plate.

U.S. Pat. No. 8,210,558 discloses a secondary lock assembly for a fifth wheel having a hitch plate with a rearward opening slot to receive a trailer kingpin and a transversely sliding primary locking member for retaining the kingpin within the slot. The assembly includes a tie bar pivotally connected at its middle to the primary locking member and a transversely oriented pull bar pivotally connected at an inner end to the forward end of the tie bar.

U.S. Pat. No. 9,302,557 includes a fifth wheel having a top plate with a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A release arm is pivotally attached to the top plate and the jaw.

U.S. Pat. No. 9,327,782 discloses a fifth wheel having a top plate with a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A bias device urges the jaw towards the closed position.

U.S. Pat. No. 9,738,333 discloses a fifth wheel having a top plate with a throat that is adapted to receive a kingpin of a trailer. A pair of locking jaws are pivotally connected to the top plate and pivotal between a closed configuration where the pair of locking jaws block passage of a kingpin out of the throat and the locking jaws are held primarily in compression and an open configuration where a kingpin may pass into and out of the throat. Each of the pair of locking jaws has an engagement surface adapted to engage a kingpin positioned in the throat when the pair of locking jaws are in the closed configuration. A locking member is movably attached to the top plate and a mechanism urges the locking member into engagement with the pair of locking jaws when the pair of locking jaws are in the closed configuration.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a fifth wheel for locking to a kingpin of a towed trailer includes an operating arm pivotable into and between a locked position for locking the kingpin in the fifth wheel and an unlocked position in which the kingpin can be removed from or inserted into the fifth wheel and a housing coupled to the operating arm. A pull handle is slidable in the housing into and between an extended position in which the pull handle extends from the housing and a retracted position in which the pull handle is retracted into the housing. A spring in the housing biases the pull handle towards the retracted position. When the operating arm is pivoted into the locked position the pull handle is forced into the extended position, and after the operating arm is pivoted to the unlocked position the pull handle moves to the retracted position.

In certain examples, a pull handle assembly for pivoting an operating arm of a fifth wheel into and between a locked position for locking a kingpin in the fifth wheel and an unlocked position in which the kingpin can be removed from the fifth wheel. The pull handle assembly has a housing configured to couple to the operating arm, a pull handle slidable in the housing into and between an extended position in which the pull handle extends from the housing and a retracted position in which the pull handle is retracted into the housing, and a spring in the housing that biases the pull handle towards the retracted position.

Various other features, objects, and advantages will be made apparent from the following description taken together with the drawings

BRIEF DESCRIPTION OF THE DRAWINGS

The present disclosure is described with reference to the following Figures. The same numbers are used throughout the Figures to reference like features and like components.

DETAILED DESCRIPTION

It is known to connect a towed trailer to a towing vehicle via a connection assembly commonly referred to as a fifth wheel. Specifically, a fifth wheel is a primary locking assembly on the towing vehicle that engages a kingpin of the towed trailer to thereby securely couple the towing vehicle to the towed trailer. Fifth wheels are constructed to avoid/prevent inadvertent disengagement of the kingpin from the fifth wheel.

Conventional fifth wheels often have a manual pull handle that allows an operator to move the fifth wheel between a locked position in which the kingpin is locked in the fifth wheel and an unlocked position in which the kingpin can be inserted into or removed from the fifth wheel. Depending on the type of towing vehicle, the manual pull handle may interfere with and/or contact the frame and/or rear tires of the towing vehicle and/or towed trailer. For example, if the manual pull handle is pulled to an extended position and an air-bag-type suspension is deflated on the towing vehicle, the manual pull handle may interfere and/or contact the frame and tires of the towing vehicle. As such, the manual pull handle may become damaged and/or the fifth wheel may not operate as intended if the manual pull handle contacts the frame or tires. Reference is made to the above-incorporated patents for further details and components of conventional fifth wheels including conventional manual pull handles.

The present inventors have endeavored to develop improved pull handles for fifth wheels. Specifically, the present inventors have endeavored to reduce or eliminate the potential for interference between the pull handle and the tires and/or frame of the towing vehicle to thereby increase safety and operability of fifth wheels. Accordingly, through research and experimentation, the present inventors have developed the retractable pull handle assemblies of the present disclosure which reduce or eliminate interference between the pull handle and the frame and/or tires of the towing vehicle and/or towed trailer. Furthermore, and in particular, the present inventors have developed retractable pull handle assemblies that can be easily retrofitted to existing fifth wheels.

Figure 1:
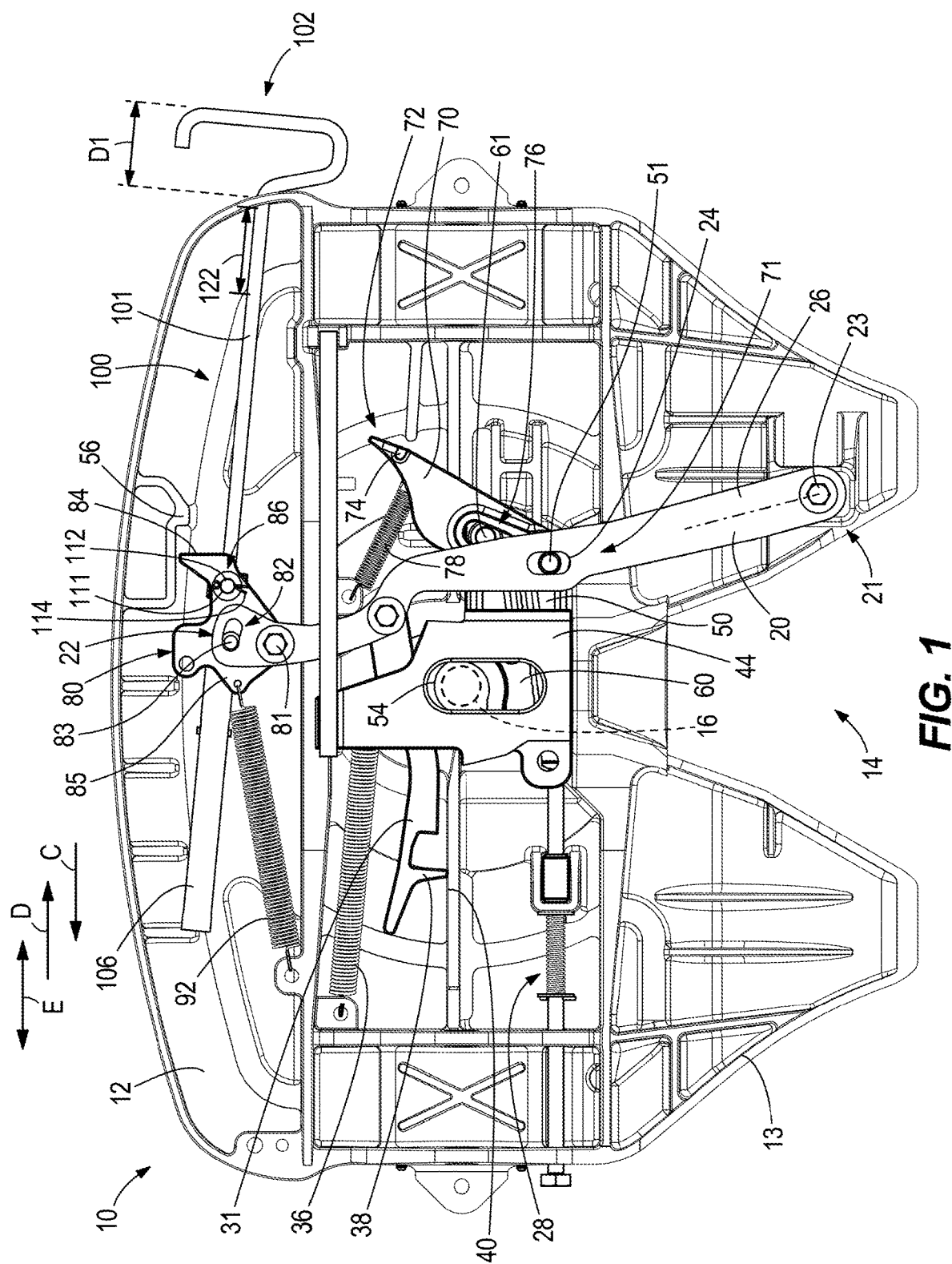
FIG. 1 is a bottom view of an example fifth wheel. An operating arm is in a locked position such that a kingpin is locked in the fifth wheel. A pull handle is in an extended position but is mostly located within the fifth wheel.
Figure 2:
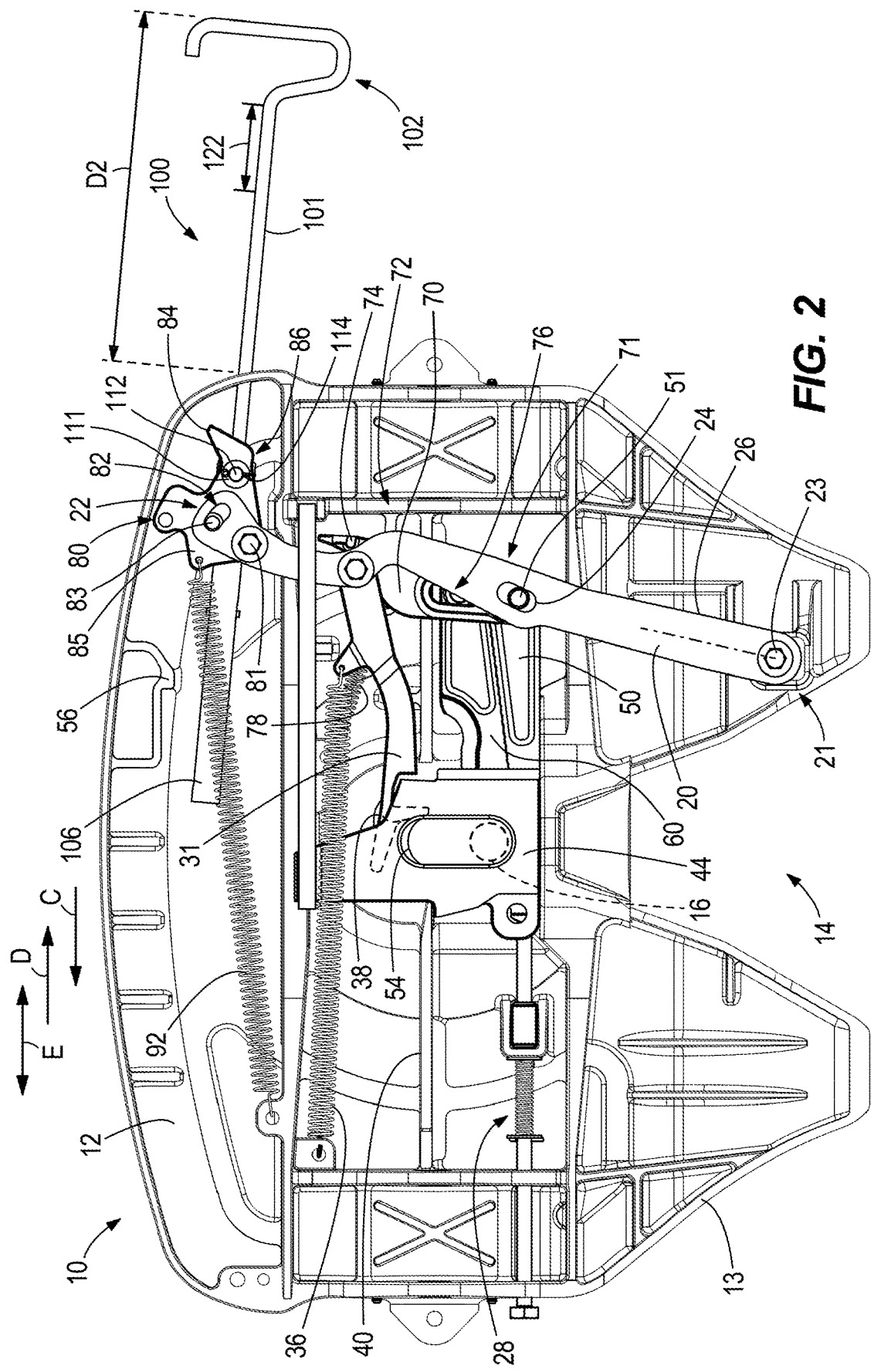
FIG. 2 is a view like FIG. 1 with the operating arm in an unlocked position such that the kingpin can be removed or inserted into the fifth wheel. The pull handle is shown in the extended position and is extending from the fifth wheel.
Figure 3:
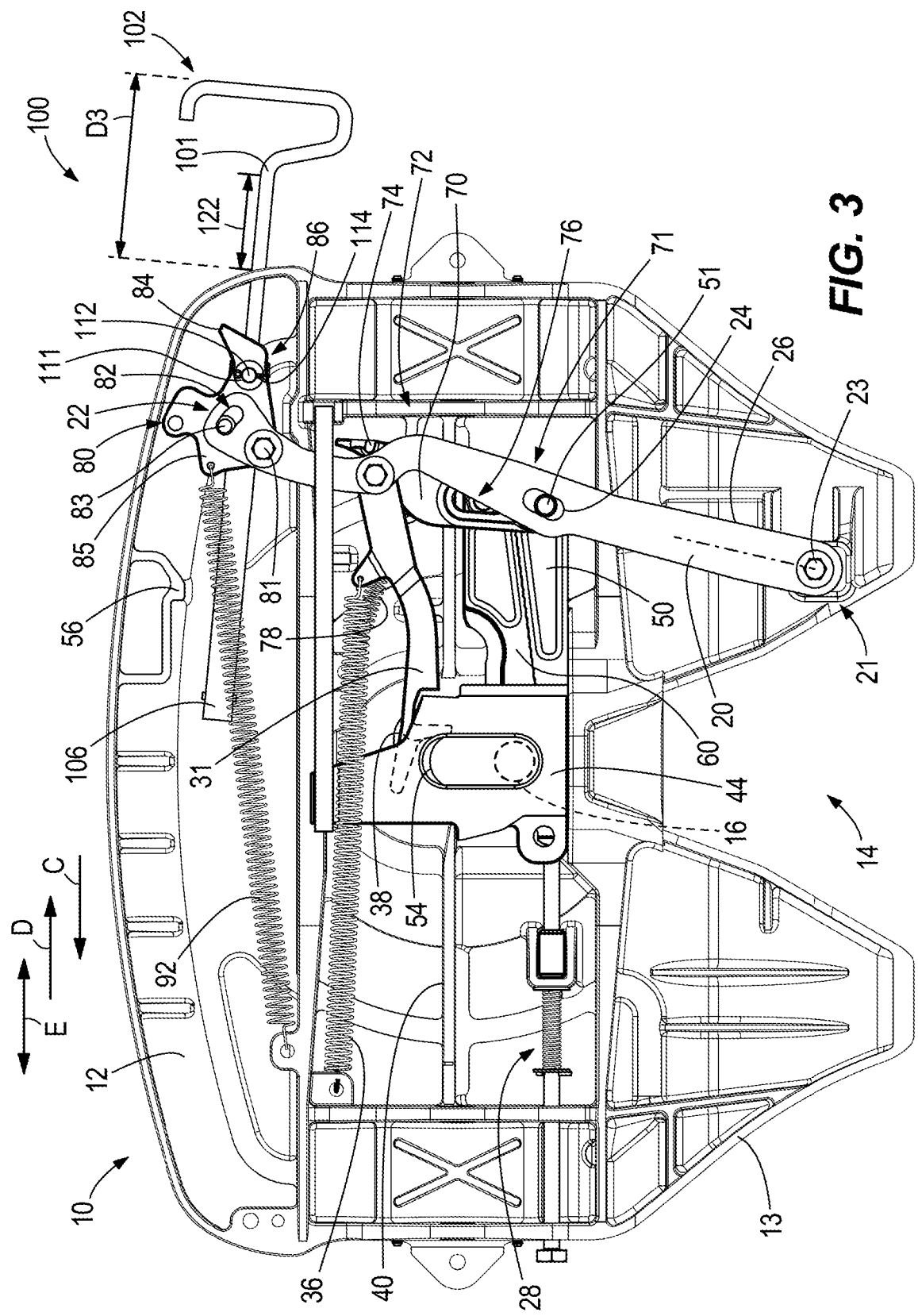
FIG. 3 is a view like FIG. 2 with the operating arm in the unlocked position and the pull handle in a retracted position but partially extending from the fifth wheel.

FIGS. 1-3 are bottom or underside views of an example fifth wheel 10 of the present disclosure. The fifth wheel 10 has a top plate 12, a flange 13, and a throat 14 into which a kingpin 16 of a towed trailer (not shown) is received. The top plate 12 can include a variety of stabilizing and strengthening structures, such as gussets, flanges, ribs, and the like, that strengthen the top plate 12 and the flange 13 and provide point(s) of attachment for various components of the fifth wheel 10. For example, a bottom plate 44 is coupled to the top plate 12 and defines a lower surface of the throat 14. The top plate 12 and the flange 13 define a protected space in which operable components of the fifth wheel 10 are positioned.

An operating arm 20 is pivotally connected to the top plate 12 at a pivot axis 23. The operating arm 20 is pivotable into and between a locked position (FIG. 1) in which the fifth wheel 10 locks onto the kingpin 16 and an unlocked position (FIGS. 2-3) in which the fifth wheel 10 unlocks from the kingpin 16 (the locked and unlocked positions are described further herein). The operating arm 20 has a first end 21 pivotally coupled to the top plate 12 at the pivot axis 23 via a mechanical fastener such as a pin or bolt. The first end 21 is adjacent to the throat 14. The operating arm 20 is elongated between the first end 21 and an opposite, second end 22. A coil spring 36 biases (e.g. pulls) the operating arm 20 toward the throat 14 in a first direction (see arrow C).

A pull handle 101 is coupled to the operating arm 20 and is operable to pivot the operating arm 20 from the locked position (FIG. 1) to the unlocked position (FIGS. 2-3). Specifically, the pull handle 101 is pulled in a second direction (see arrow D) such that the operating arm 20 pivots toward the unlocked position (FIGS. 2-3) and away from the throat 14. As the operating arm 20 pivots toward the unlocked position (FIGS. 2-3), a wedge 50 and a jaw 60, which are pivotally coupled to the operating arm 20, also move away from the throat 14 (see arrow D). Accordingly, the kingpin 16 can be inserted into the throat 14 or removed from the throat 14. When the kingpin 16 is inserted into the throat 14, the operating arm 20 pivots back to the locked position (FIG. 1), due to the coil spring 36 exerting a pulling force on the operating arm 20. As the operating arm 20 pivots toward the locked position (FIG. 1), the wedge 50 and the jaw 60 move toward the throat 14 (see arrow C) to thereby lock the fifth wheel 10 onto the kingpin 16 (described further herein). As the wedge 50 and the jaw 60 move toward the throat 14 (see arrow C), the wedge 50 urges the jaw 60 into contact with the kingpin 16 to thereby force the kingpin 16 against a fixed jaw 54 on the top plate 12 and lock the fifth wheel 10 onto the kingpin 16.

The wedge 50 is pivotally coupled to the operating arm 20 between the ends 21, 22 of the operating arm 20 by a wedge pin 51 that is received in a first slot 24 of the operating arm 20. The wedge pin 51 slides in the first slot 24 as the operating arm 20 pivots such that the wedge 50 linearly moves (see direction arrow E). In certain examples, a knock-out assembly 28 is coupled to the top plate 12 and can be actuated to apply a direct force to the wedge 50 to thereby dislodge the wedge 50 and/or the operating arm 20 in the event either component becomes jammed and prevents the release of the kingpin 16 from the fifth wheel 10.

The jaw 60 is also pivotally coupled to the operating arm 20 via a timing lever 70. The jaw 60 has a jaw pin 61 that is received in an elongated slot 76 of the timing lever 70 and a first end 71 pivotally coupled to the operating arm 20 via the wedge pin 51 (see above). As the operating arm 20 pivots, the wedge 50 moves (as described above), the timing lever 70 pivots about wedge pin 51, the jaw pin 61 slides in the elongated slot 76, and the jaw 60 moves with the wedge 50. The timing member 70 has an opposite, second end 72 with a follower pin 74 extending therefrom that slides along an outside edge 26 (FIG. 2) of the operating arm 20 as the operating arm 20 pivots. The timing lever 70 is biased toward the throat 14 with an extension spring 78. The operating arm 20, the wedge 50, and the timing lever 70 are all generally plate-like members and are in stacked relation to one another. Reference is made to above-incorporated U.S. Pat. Nos. 5,641,174 and 5,988,665 for description and operation of a conventional timing lever and associated components.

A trigger arm 31 is pivotally coupled to the operating arm 20 and is for holding the operating arm 20 in the unlocked position (FIGS. 2-3). The trigger arm 31 extends transverse to the throat 14 and slides on the bottom plate 44 as the operating arm 20 pivots into and between the locked position (FIG. 1) and the unlocked position (FIGS. 2-3). The trigger arm 31 has a trigger 38 that moves into the throat 14 as the operating arm 20 pivots toward the unlocked position (FIGS. 2-3). The trigger 38 prevents the operating arm 20 from pivoting back to the locked position (FIG. 1) until the kingpin 16 inserted into the throat 14. Specifically, when the kingpin 16 is received into the throat 14, the kingpin 16 contacts and moves the trigger 38 out of the throat 14 causing the trigger arm 31 to pivot relative to the operating arm 20 and the trigger 38 to clear the bottom plate 44. The trigger arm 31 then slides along the bottom plate 44 and the operating arm 20 pivots back toward the locked position (FIG. 1) as the coil spring 36 "pulls" the operating arm toward the throat 14. In the example depicted in FIG. 1, the trigger 38 is a finger member that projects from the trigger arm 31. The coil spring 36 is shown connected to the trigger arm 31, however, in other examples the coil spring 36 is directly connected to the operating arm 20.

The operating arm 20 is held or locked in the locked position (FIG. 1) with a secondary lock assembly 80 that is pivotally coupled to the second end 22 of the operating arm 20 via pin 81. The secondary lock assembly 80 has a pawl member 84 and an opposite, dog member 85 that each radially extend away from a stabilizing pin 83 that is received in an arcuate slot 82 defined in the second end 22 of the operating arm 20. A coil spring 92, connected between the secondary lock assembly 80 and a flange on the top plate 12, exerts a pulling force in the first direction (see arrow C) to thereby urge the secondary lock assembly 80, and further urge the operating arm 20, toward the locked position (FIG. 1) and in the first direction (see arrow C). In operation, as the operating arm 20 pivots from the unlocked position (FIGS. 2-3) toward the locked position (FIG. 1) the secondary lock assembly 80 moves in the first direction (see arrow C) and the pawl member 84 seats behind a stop surface 56 on the top plate 12 to thereby stop or prevent the operating arm 20 from thereafter pivoting in the opposite second direction (see arrow D) toward the unlocked position (FIG. 2). To pivot the operating arm 20 to the unlocked position (FIGS. 2-3), the pawl member 84 must be pivoted about pin 81 to clear the stop surface 56. The pull handle 101 is connected to the secondary lock assembly 80 in such a way that as the operator pulls the pull handle 101 in a second direction (see arrow D) the pawl member 84 pivots about pin 81 to clear the stop surface 56 and the operating arm 20 is free to pivot to the unlocked position (FIG. 2). Accordingly, the kingpin 16 can be received into or moved out of the fifth wheel 10.

The pull handle 101 is part of a pull handle assembly 100 that automatically retracts the pull handle 101 back into the fifth wheel 10 when the operating arm 20 is in the unlocked position (FIGS. 2-3) and the pull handle 101 is manually released. Operation and components of the pull handle assembly 100 are described hereinbelow with reference to FIG. 4. The pull handle assembly 100 has a housing 106 with a first end 107, an opposite second end 108, and one or more elongated slots 109 longitudinally extending along the length of housing 106 (see longitudinal axis 140 on FIG. 4). In the example depicted, two slots 109 are located along opposite sides of the housing 106 (note that one of the slots 109 is not shown in FIG. 4). Each slot 109 has a first slot end 118, the opposite second slot end 119, and a length L. In certain examples, the length L of the slot 109 is 3.0-4.0 inches. An end cap 111 is fixedly coupled to the first end 107 of the housing 106 and includes a stud 112 radially extending therefrom. In certain examples, the housing 106 is a hollow cylinder that extends along the longitudinal axis 140.

The pull handle 101 is slidable in the housing 106 and has a handle end 102 that extends out of the housing 106 and an opposite second end 103 that is received in the housing 106. Specifically, the pull handle 101 is slidable relative to the housing 106 into and a between an extended position (see FIGS. 1-2) in which the pull handle 101 extends out of the housing 106 and a retracted position (see FIG. 3) in which the pull handle is retracted into the housing 106. A fastener 104, such as a shoulder bolt and nut, slidably connects the second end 103 to the housing 106 via the slots 109. The fastener 104 slides in the slots 109 as the second end 103 slides in the housing 106. Note that the slots 109 limit sliding of second end 103 in the housing 106, and in certain examples, the fastener 104 is integrally formed with the pull handle 101. In another example, the pull handle 101 has a projection that slides in one or both of the slots 109 as the second end 103 slides in the housing 106. A spring 115, such as a compression spring, in the housing 106 between the end cap 111 and the second end 103 of the pull handle 101 urges the second end 103 of the pull handle 101 away from the end cap 111 (see arrow F).

Figure 4:
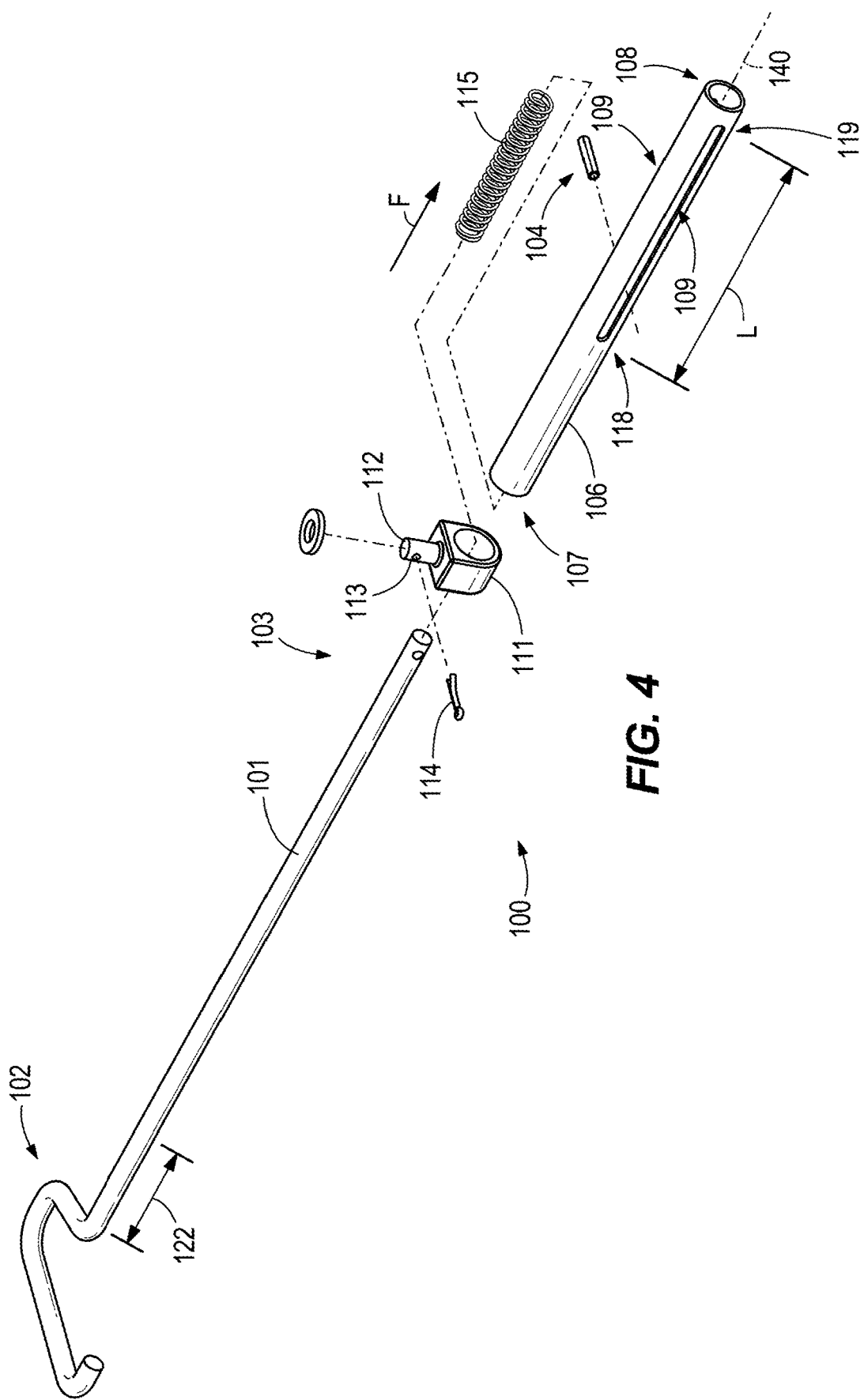
FIG. 4 is an exploded view of an example retractable pull handle assembly with the pull handle.

Referring to FIG. 1, the pull handle assembly 100 is coupled to the secondary lock assembly 80 such that the pull handle assembly 100 can pivot the operating arm 20 as the pull handle 101 is manually pulled. In certain examples, the pull handle assembly 100 is capable of being installed on (or retrofitted to) existing in-use fifth wheels. The pull handle assembly 100 is coupled to the secondary lock assembly 80 by inserting the stud 112 of the end cap 111 into a handle receiving hole 86 and inserting a cotter pin 114 into a bore 113 in the stud 112 (FIG. 4). The handle end 102 can be manually pulled in the second direction (see arrow D) such that the pull handle 101 is moved to the extended position relative to the housing 106. The handle end 102 is then braced against the outside surface of flange 13 and extends a first distance D1 (e.g. minimum distance) away from the fifth wheel 10. While pull handle 101 is in the extended position, the spring 115 (FIG. 4) is compressed in the housing 106 and the fastener 104 is at the first slot ends 118 of the slots 109 (FIG. 4).

Example operational sequences for unlocking and locking the fifth wheel 10 using the pull handle assembly 100 are described hereinbelow with reference to FIGS. 1-3. Note that the components of the pull handle assembly 100 discussed hereinbelow that are not depicted in FIGS. 1-3 are depicted in FIG. 4.

FIG. 1 depicts the kingpin 16 locked in the throat 14 of the fifth wheel 10. As described above, the jaw 60 forces the kingpin 16 into contact with the fixed jaw 54 when the operating arm 20 is moved into the locked position to thereby lock the kingpin 16 in the fifth wheel 10. Accordingly, the secondary lock assembly 80 is seated behind the stop surface 56, the pull handle 101 is in the extended position relative to the housing 106, and the pull handle 101 extends the first distance D1 away from the fifth wheel 10.

Referring now to FIG. 2, the fifth wheel 10 is shown unlocked such that the kingpin 16 can be removed from the throat 14. To unlock the fifth wheel 10, an operator grasps the handle end 102 of the pull handle 101 and pulls in the second direction (see arrow D) to pivot the secondary lock assembly 80 to clear the stop surface 56 and further pivot the operating arm 20 to the unlocked position. As the pull handle 101 is pulled, the fastener 104 positively engages the first slot ends 118 of the slots 109 in the housing 106 (FIG. 4) such that the pulling force applied to the pull handle 101 is transferred to the housing 106, the secondary lock assembly 80, and the operating arm 20. Accordingly, the operating arm 20 pivots to the unlocked position and the pull handle 101 is in the extended position relative to the housing 106 and extends a second distance D2 (e.g. maximum distance) from the fifth wheel 10.

Referring now to FIG. 3, the fifth wheel 10 remains unlocked and the operating arm 20 is held in the unlocked position due to the trigger 38 of the trigger arm 31 being received into the throat 14 (as described above). After the operator releases the pull handle 101, the spring 115 in the housing 106 causes pull handle 101 to retract (see arrow C) into the housing 106 and the fifth wheel 10. Specifically, the spring 115 causes the second end 103 of the pull handle 101 to slide in the housing 106 toward the second end 108 (see arrow C) and the fastener 104 to slide in the slots 109 toward the second slot ends 119 of the slots 109 (see FIG. 4). At the same time, the handle end 102 is retracted toward the flange 13 of the fifth wheel 10 (see arrow C) such that the pull handle 101 is in a retracted position relative to the housing 106 and extends a third distance D3 (e.g. retracted distance) from the fifth wheel 10. The third distance D3 is less than the second distance D2 (see FIG. 2) such that the pull handle 101 is less likely to interfere with the tires of the towing vehicle. In addition, an indicator section 122 of the pull handle 101 remains visible to the operator to thereby indicate that the fifth wheel 10 is unlocked. The indicator section 122 is painted or otherwise marked to be more visible than the other sections of the pull handle 101. In certain examples, the length of the indicator section 122 is 3.0-5.0 inches. In certain examples, the indicator section 122 is adhesive tape on the pull handle 101.

Referring to FIG. 1, the operating arm 20 remains in the unlocked position (FIGS. 2-3) until the kingpin 16 is received into the throat 14 and moves the trigger 38 out of the throat 14. Once the trigger 38 is out of the throat 14, the operating arm 20 pivots toward the locked position and the kingpin 16 is locked in the fifth wheel 10. As the operating arm 20 pivots to the locked position, the pull handle 101 is further retracted toward the fifth wheel 10 and extends the first distance D1 from the fifth wheel 10. Accordingly, the indicator section 122 of the pull handle 101 is not visible to the operator and thereby the operator determines that the kingpin 16 is properly locked in the fifth wheel 10. Note that when the operating arm 20 pivots toward the locked position (FIG. 1) the pull handle 101 is moved to the extended position relative to the housing 106 as the handle end 102 contacts the flange 13.

In certain examples, a fifth wheel for locking to a kingpin of a towed trailer includes an operating arm pivotable into and between a locked position for locking the kingpin in the fifth wheel and an unlocked position in which the kingpin can be removed from or inserted into the fifth wheel and a housing coupled to the operating arm. A pull handle is slidable in the housing into and between an extended position in which the pull handle extends from the housing and a retracted position in which the pull handle is retracted into the housing. A spring in the housing biases the pull handle towards the retracted position. When the operating arm is pivoted into the locked position the pull handle is forced into the extended position, and after the operating arm is pivoted to the unlocked position the pull handle automatically moves to the retracted position.

In certain examples, as the operating arm pivots from the unlocked position toward the locked position the pull handle contacts the fifth wheel and thereby is pulled out of the housing into the extended position. The pull handle has an indicator section that extends from the fifth wheel when the operating arm is in the unlocked position to thereby indicate that the operating arm is in the unlocked position. In certain examples, when the operating arm is in the locked position and the pull handle is in the extended position the pull handle extends a first distance from the fifth wheel. When the operating arm is in the unlocked position and the pull handle is in the extended position, the pull handle extends a second distance from the fifth wheel that is greater than the first distance. When the operating arm is in the unlocked position and the pull handle is in the retracted position, the pull handle extends a third distance from the fifth wheel that is greater than the first distance and less than the second distance.

In certain examples, the pull handle is coupled to the housing through a slot defined in the housing, and wherein the pull handle slides along the slot. The slot has a first slot end and an opposite second slot end that limit sliding of the pull handle in the housing. The slot is one of a pair of slots, and the pull handle is coupled to the housing through the pair of slots. Each slot in the pair of slots can be on an opposite side of the housing. In certain examples, the pull handle has a projection that extends away from the pull handle and is slidably received into one of the slots of the pair of slots. Each slot in the pair of slots has a first slot end and an opposite second slot end that limit sliding of the pull handle in the housing, and when the pull handle is in the extended position, the projection is at the first slot end of each slot. The housing has a first end with an end cap and an opposite second end and the spring is between the end cap and the second end of the pull handle to thereby bias the second end of the pull handle toward the second end of the housing. The end cap has as a stud radially extending therefrom and the stud is configured to be coupled to the operating arm.

In certain examples, a pull handle assembly for pivoting an operating arm of a fifth wheel into and between a locked position for locking a kingpin in the fifth wheel and an unlocked position in which the kingpin can be removed from the fifth wheel. The pull handle assembly has a housing configured to couple to the operating arm, a pull handle slidable in the housing into and between an extended position in which the pull handle extends from the housing and a retracted position in which the pull handle is retracted into the housing, and a spring in the housing that biases the pull handle towards the retracted position. The housing is a hollow cylinder that extends on an axis and has a pair of slots that each extend parallel to the axis. Each slot of the pair of slots is opposite each other, and the pull handle has a projection that extends away from the pull handle and is slidably received into the pair of slots. In certain examples, each slot of the pair of slots has a first slot end and an opposite second slot end that limit sliding of the pull handle in the housing, and pull handle has a first end and an opposite second end such that when the pull handle is in the extended position the second end of the pull handle is at the first slot end of each of the slots. The housing has a first end with an end cap and an opposite second end, and the spring is between the end cap and the second end of the pull handle to thereby bias the second end of the pull handle toward the second end of the housing.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

What is claimed is:

1. A fifth wheel for locking to a kingpin of a towed trailer, the fifth wheel comprises:
   an operating arm pivotable into and between a locked position for locking the kingpin in the fifth wheel and an unlocked position in which the kingpin can be removed from or inserted into the fifth wheel;
   a housing coupled to the operating arm;
   a pull handle slidable in the housing into and between an extended position in which the pull handle extends from the housing and a retracted position in which the pull handle is retracted into the housing; and
   a spring in the housing that biases the pull handle towards the retracted position;
   wherein when the operating arm is pivoted into the locked position the pull handle is forced into the extended position, and wherein after the operating arm is pivoted to the unlocked position the pull handle automatically moves to the retracted position.

2. The fifth wheel according to claim 1, wherein as the operating arm pivots from the unlocked position toward the locked position the pull handle contacts the fifth wheel and thereby is pulled out of the housing into the extended position.

3. The fifth wheel according to claim 1, wherein the pull handle has an indicator section that extends from the fifth wheel when the operating arm is in the unlocked position to thereby indicate that the operating arm is in the unlocked position.

4. The fifth wheel according to claim 1, wherein when the operating arm is in the locked position and the pull handle is in the extended position the pull handle extends a first distance from the fifth wheel;
   wherein when the operating arm is in the unlocked position and the pull handle is in the extended position the pull handle extends a second distance from the fifth wheel that is greater than the first distance; and
   wherein when the operating arm is in the unlocked position and the pull handle is in the retracted position the pull handle extends a third distance from the fifth wheel that is greater than the first distance and less than the second distance.

5. The fifth wheel according to claim 1, wherein the pull handle is coupled to the housing through a slot defined in the housing, and wherein the pull handle slides along the slot.

6. The fifth wheel according to claim 5, wherein the slot has a first slot end and an opposite second slot end that limit sliding of the pull handle in the housing.

7. The fifth wheel according to claim 5, wherein the slot is one of a pair of slots, and wherein the pull handle is coupled to the housing through the pair of slots.

8. The fifth wheel according to claim 7, wherein the each slot in the pair of slots is on an opposite side of the housing.

9. The fifth wheel according to claim 6, wherein the pull handle has a projection that extends away from the pull handle and is slidably received into one of the slots of the pair of slots.

10. The fifth wheel according to claim 9, wherein each slot in the pair of slots has a first slot end and an opposite second slot end that limit sliding of the pull handle in the housing, and when the pull handle is in the extended position the projection is at the first slot end of each slot.

11. The fifth wheel according to claim 5, wherein the housing has a first end with an end cap and an opposite second end, and wherein the spring is between the end cap and the second end of the pull handle to thereby bias the second end of the pull handle toward the second end of the housing.

12. The fifth wheel according to claim 11, wherein the spring is a compression spring.

13. The fifth wheel according to claim 10, wherein the end cap has as a stud radially extending therefrom, and wherein the stud is configured to be coupled to the operating arm.

14. A pull handle assembly for pivoting an operating arm of a fifth wheel into and between a locked position for locking a kingpin in the fifth wheel and an unlocked position in which the kingpin can be removed from the fifth wheel, the pull handle assembly comprising:
   a housing configured to couple to the operating arm, wherein the housing is a hollow cylinder that extends along an axis and has a pair of slots that each extend parallel to the axis;
   a pull handle slidable in the housing and along the pair of slots into and between an extended position in which the pull handle extends from the housing and a retracted position in which the pull handle is retracted into the housing; and
   a spring in the housing that biases the pull handle towards the retracted position;
   wherein each slot of the pair of slots is opposite each other, and wherein the pull handle has a projection that extends away from the pull handle and is slidably received into one of the slots;
   wherein the each slot of the pair of slots has a first slot end and an opposite second slot end that limit sliding of the pull handle in the housing; and
   wherein the pull handle has a first end and an opposite second end, and wherein when the pull handle is in the extended position the second end of the pull handle is at the first slot end of each of the slots.

15. The pull handle assembly according to claim 14, wherein the housing has a first end with an end cap and an opposite second end, and wherein the spring is between the end cap and the second end of the pull handle to thereby bias the second end of the pull handle toward the second end of the housing.

16. The pull handle assembly according to claim 15, wherein the spring is a compression spring.

17. The pull handle assembly according to claim 15, wherein the end cap has a stud radially extending therefrom, and wherein the stud is configured to be coupled to the operating arm.

18. A pull handle assembly for pivoting an operating arm of a fifth wheel into and between a locked position for locking a kingpin in the fifth wheel and an unlocked position in which the kingpin can be removed from the fifth wheel, the pull handle assembly comprising:
   a housing configured to couple to the operating arm, wherein the housing is a hollow cylinder that extends along an axis and has a pair of slots that each extend parallel to the axis;
   a pull handle slidable in the housing and along the pair of slots into and between an extended position in which the pull handle extends from the housing and a retracted position in which the pull handle is retracted into the housing; and a spring in the housing that biases the pull handle towards the retracted position;

wherein the pull handle has an indicator section that extends from the fifth wheel when the operating arm is in the unlocked position to thereby indicate that the operating arm is in the unlocked position.

* * * * *